United States Patent [19]

Ley et al.

[11] Patent Number: 4,940,734
[45] Date of Patent: Jul. 10, 1990

[54] PROCESS FOR THE PREPARATION OF POROUS POLYMER BEADS

[75] Inventors: David A. Ley, New Canaan; Laura J. Hiscock, Norwalk, both of Conn.; Michael T. Cooke, New York, N.Y.

[73] Assignee: American Cyanamid, Me.

[21] Appl. No.: 275,170

[22] Filed: Nov. 23, 1988

[51] Int. Cl.⁵ ............................................. C08J 9/28
[52] U.S. Cl. ...................................... 521/84.1; 521/64; 521/89; 521/143; 521/147; 530/413
[58] Field of Search .................... 521/84.1, 89, 60, 63, 521/64, 142, 143, 144, 147, 149; 530/413

[56] References Cited

U.S. PATENT DOCUMENTS

| | | | |
|---|---|---|---|
| 3,938,001 | 9/1976 | Coupek et al. | 435/213 |
| 4,094,848 | 6/1978 | Naito | 521/149 |
| 4,110,529 | 8/1978 | Stoy | 528/491 |
| 4,247,498 | 1/1981 | Castro | 264/41 |
| 4,486,549 | 12/1984 | Matsumoto et al. | 435/180 |
| 4,519,909 | 5/1985 | Castro | 521/64 |
| 4,594,207 | 6/1986 | Josefiak et al. | 521/63 |
| 4,666,607 | 5/1987 | Josefiak et al. | 425/67 |

Primary Examiner—Veronica P. Hoke
Attorney, Agent, or Firm—Steven Flynn

[57] ABSTRACT

Isotropic porous polymer beads having controllable surface porosity and large pore diameters from about 0.002 to about 5 microns are produced from solutions of an acrylonitrile polymer or a copolymer by a thermally-induced phase separation process including intensively shearing the polymer solution into small droplets. The use of mixed solvent non-solvent combinations as solvents for the polymers, and preferably reducing the polymer content in solution to below 10 percent produces high pore content, substantially spherical beads having a morphology ideally suited to the chromatography of large molecules, such as proteins, and for enzyme-binding.

20 Claims, 8 Drawing Sheets

PROCESS FOR THE PREPARATION OF POROUS POLYMER BEADS

CROSS-REFERENCE TO RELATED APPLICATION

This application is related to a commonly assigned, concurrently filed application of Michael Timothy Cooke, and Laura Jean Hiscock for Porous Polymer Beads and Process, Ser. No. 07/275,256, and Michael Timothy Cooke and Laura Jean Hiscock for Porous Polyacrylonitrile Beads and Process, Ser. No. 07/275,317.

This invention relates to isotropic porous polymer beads of an aerylonitrile having controllable surface porosity pore diameters ranging from 0.002 to 5 microns and a pore volume of not substantially less than 1.5 ml/g. The beads are made from acrylonitrile polymer solutions by a thermally-induced phase separation process. The morphology of the beads makes them ideally suitable for use in chromatography applications especially in biomolecular separation processes such as protein separations.

BACKGROUND OF THE INVENTION

Phase separation processes of polymer solutions, including those of acrylonitrile, have been very useful for the preparation of porous low-density microcellular plastic foams, primarily in the form of fibers, sheets and blocks or slabs.

In U.K. Patent Specification No. 938,694, a microporous material is made by mixing a finely divided thermoplastic resin with a gel-forming solvent therefore, raising the temperature of the mixture above the gelling point thereof, decreasing the temperature to form a gel and removing the gel forming-solvent from the mixture by treatment with a solvent for the gel-forming solvent but not for the thermoplastic resin In the example of this U.K. patent, 35 percent by volume of polyethylene resin was heated with 65 percent by volume of xylene at 140° C. and allowed to cool to room temperature, whereupon a gelled mass was formed The mass was cut into sheets and the xylene was extracted with ethanol. After removal of the ethanol with water, microporous foam sheets were obtained, which had a pore size of below about 1.0 micron and a total porosity of about 65 percent, the sheets being useful as separators in a storage battery, for example.

In Young, et al., U.S. Patent No. 4,430,451, such a process was used to produce low density foams from poly(4-methyl-lpentene) resin and a solvent comprising bibenzyl and using, for example, methanol, to remove the bibenzyl leaving the resin in the form of a fragile, microcellular, low density foam, having a broadly disclosed pore volume of from 90 to 99 percent, and a specifically exemplified pore volume of about 94 percent. Such foams were machined into blocks for laser fusion targets.

In Castro, U.S. Patent Nos. 4,247,498 and 4,519,909, the thermally-induced phase separation technology was employed to make microporous foams in forms ranging from films to blocks to intricate shapes. In the '909 Patent, it is stated in Col. 6, lines 34-35, that "as the solution is cooled to the desired shape, no mixing or other shear force is applied while the solution is undergoing the cooling." This strongly suggests that beads were not contemplated. In the '909 Patent at Col. 27-28, microporous polymers containing functional liquids are disclosed. The polymers are said to have either a cellular or non-cellular structure in which the liquid is incorporated. A cellular structure is defined in Col. 7 as are having a series of enclosed cells having substantially spherical shapes with pores or passageways interconnecting adjacent cells, the diameter of said cells being at least twice the diameter of said pores. Such a morphology is not ideal for adsorbing large molecules because the passageways are not of uniform diameter and this represents a serious drawback for large molecule absorption and desportion.

Stoy, U.S. Patent No. 4,110,529, disclosed spherical polyacrylonitrile beads formed by a process in which a polymer solution is dispersed in a "liquid dispersing medium that is a nonsolvent for the polymeric material and and is immiscible with the solvent." The emulsion is added "with stirring into an excess of a coagulating liquid that coagulates the polymer material . . . and that is a non-solvent for the polymer material, is miscible with the solvent, and is immiscible with the dispersing medium." In adopting the classical method to making beads, applicants herein can, for example, form a hot emulsion of a polymer solution in mineral oil and quench the same by adding it to mineral oil at a lower temperature. Therefore, applicants do not use a "coagulating" bath which is immiscible with the polymer solution and miscible with the dispersing medium. The main drawback with the Stoy process, however, is that, even though up to or greater than 95 percent void content is obtained, as set forth in Col. 3, lines 39-41, "a non-sticky skin is formed on the surface of the droplets at the very beginning of the coagulation." Such a skin cannot be controlled by such a process and is only partially permeable, thus substantially interfering with the absorption and desorption of large molecules, and making very desirable the production of non-skinned or controllably skinned microporous beads. Additionally, as will be shown in the comparative examples hereinafter, beads made using the process disclosed in Stoy possess nonisotropic pores, with large pores concentrated in the interior and thus further contributes chromographic applications and the desorption of large molecules.

Matsumoto, in U.S. Patent No. 4,486,549 generally discloses porous fibers and filaments, but also teaches the formation of polyacrylonitrile particles having a porous structure by adding the polymer solution dropwise into an atomizer cup in Example 1 of the patent. However, beads produced in this method have low pore volume, 0.90 ml/g, as seen in Comparative Example 1A of this application, this is responsible for low capacity The particles tend to be flattened and non-spherical, as shown in FIG. 8, and this will cause excessive pressure drops.

Of general interest is Josefiak et al., U.S. Pat. No. 4,594,207, in which the technology is used to produce porous bodies, such as fibers, hollow filaments, tubes, tubing, rods, blocks and powdery bodies from polyolefins, poly (vinyl esters), polyamides, polyurethanes, and polycarbonates. Polyacrylonitriles were not used. There were adjustments in total pore volume, pore size, and pore walls made by varying solvent ratios; the pore volumes exemplified are in the 75-77.5 percent range. Josefiak discloses shaping the viscous solution by methods requiring no shearing during cooling. Examples 1-5 in the Josefiak patent describe the shaping of hollow filaments by spinning the solution through a hollow filament nozzle and then cooling; and Examples 5-7 describe the forming of membranes by coating a plate glass with the solution and then cooling. It is also noticed in Josefiak, U.S. Pat. No. 4,666,607, Col. 2, line 43 to Col. 3, line 14 that he teaches away from using strong shear forces during cooling. At no point in the disclosures does Josefiak contemplate the use of turbulence during cooling, thus, strongly suggesting that beads were not contemplated. In contrast to the present invention, shear is used in the solution prior to and during cooling, so as to form droplets which cool into beads These beads surprisingly provide a high degree of separation capability in in chromatographic applications, low resistance to chromatographic flow rates and excellent morphological advantages for column packing applications, such as having good compressive strength and being substantially spherical. In Zwick, Applied Polymer Symposia, No. 6, 109-149, 1967, a similar method was used to prepare microporous fibers using polymer concentrations in the wetspinning range, 10-25 percent, producing microporous structures with pore volumes in the 75-90 percent range.

In Coupek et al., U.S. Pat. No. 3,983,001, is described a method of isolating biologically active compounds by affinity chromatography. The compounds isolated include enzymes, coenzymes, enzyme inhibitors, antibodies, antigens, hormones, carbohydrates, lipids, peptides and proteins as well as nucleotides, nucleic acids and vitamins, such as Vitamin B. Among the porous carriers are mentioned polyacrylonitrile particles, but these are macroporous, require secondary shaping processes to form particles from the gel obtained by practicing this invention, and are inferior in other chromatographic processes, particularly for size exclusion chromotography.

The current state of the art of microporous beads for purification, chromatography, enzyme binding and the like, are represented by the highly porous hydrophylic resins for sale under the trademark SEPABEADS® by Mitsubishi Chemical Industries Limited. These are said to comprise hard spherical gel beads composed of highly porous hydrophilic vinyl polymer. They have an average diameter of 120 microns and a pore volume of less than 1.6 ml/g. Also to be mentioned, the same company produces DIAION® highly porous polymer beads comprised of styrene crosslinked with divinyl benzene. Such beads can have a narrow pore size distribution, their pore volume is less than 1.2 ml/g.

It is thus apparent from the state of the art set forth above that a major drawback of many microporous polymer structures has been the pore volume being less than desired, typically from 20 to 75 percent of the polymer structure, or up to 90 percent, but, as seen in Castro, mechanical strength difficulties arise. Lower void volume enhances mechanical strength, but produces low capacity when used in structures such as chromatography adsorbants. Other prior art structures are in the shape of fibers, filaments or membranes and cannot be effectively used to pack chromatographic columns, thus requiring costly secondary shaping equipment. Many of the prior art structures are not rigid and can swell with changes in ionic strength or solvent making column packing and control difficult.

It has now been discovered that microporous beads, substantially spherical in shape, having very high void volume, a surface of controlled porosity, large pore diameters and high mechanical strength can be produced in thermal-induced phase separation methods by judicious selection of process techniques. Such beads are novel and their valuable properties are entirely unexpected in view of the prior art and the best materials made commercially available to date. The non-skinned beads of this invention permit access of large molecules to their inner surface areas. They are made by a process which does not involve difficult to control chemical reactions, such as formation of beads from monomers. The morphology of the beads makes them ideally suited for most chromatography applications, especially for the chromatography of proteins. They can also be used for enzyme immobilization, hormone separations, and for many other applications.

DESCRIPTION OF THE DRAWINGS

The invention can be understood by reference to the drawings in which.

SUMMARY OF THE INVENTION

Figure 1:
FIG. 1 is a photomicrograph at 500× magnification of microporous spherical poly(acrylonitrile) copolymer beads of this invention, and illustrates a skinless surface.

In accordance with the present invention there are provided highly porous beads with controlled surface porosity comprising a polymer or copolymer of an acrylonitrile, said bead being substantially non-swellable in water, and having substantially uniform pores of not substantially greater than about 5 microns in diameter and wherein the pore volume is not substantially less than about 1.5 ml/g.

The invention also contemplates such porous polymer beads, the pores being at least partially filled with a high molecular size compound, and the beads being substantially spherical.

In a preferred manner of making the beads, acrylonitrile polymer or copolymer is dissolved in a solvent mixture that can only solubilize the polymer at elevated temperatures. The solvent mixture contains a good solvent for the polymer mixed with at least one additive that decreases the solvating power of the solvent. This additive can be a non-solvent for the polymer. The homogeneous liquid solution is subjected to a shearing process to produce droplets of the polymer solution. Preferred methods of shearing the two phase liquid mixture to form droplets are homogenization, break up of laminar jets, atomization, static mixing, and ultrasonification. When using homogenization or static mixing, the homogeneous polymer solution is suspended in a hot inert dispersing liquid prior to shearing. Upon cooling the suspension, a phase separation occurs between the polymer and polymer solvent producing droplets of said polymer and polymer solvent. The droplets are introduced to a cool inert liquid with stirring. The droplets are then collected and the polymer solvent is extracted to produce the porous beads of this invention. The beads have uniform size pores (0.002–5 microns in diameter) and no cells connecting the pores are seen as described in much of the prior art. The cell diameter to pore diameter ratio C/P would be accordingly, 1.0, distinguishing them from the preferred embodiments of Castro. The uniform microporosity is believed to be due to selecting a proper solvent/non-solvent composition. Use of less than about 10 percent by weight of polymer in the solution is preferred to provide a substantially skinless bead with a pore volume of greater than 90 percent. The facts that the beads have controllable surface porosity that they do not stick together and that they possess good handling strength even at high pore volume are entirely unexpected.

DETAILED DESCRIPTION OF THE INVENTION

The porous beads of this invention are made from acrylonitrile polymers and/or copolymers. The acrylonitrile copolymers comprise polyacrylonitrile copolymerized with a ($C_2$–$C_6$) mono-olefin, a vinylaromatic, a vinylamino aromatic, a vinyl halide, a ($C_1$–$C_6$)alkyl(meth)acrylate a (meth) acrylamide, a vinyl pyrrolidone, a vinylpyridine, a ($C_1$–$C_6$) hydroxyalkyl(meth)acrylate, a (meth)acrylic acid, a ($C_1$–$C_6$) alkyl (meth)acrylamide, an acrylamidomethylpropylsulfonic acid, an N-hydroxy-containing ($C_1$–$C_6$)alkyl (meth)acrylamide, or a mixture of any of the foregoing.

As solvents for acrylonitrile polymers, any organic or inorganic liquid capable of dissolving them without permanent chemical transformation can be used. These include dimethyl sulfoxide, dimethyl formamide dimethyl sulfone, aqueous solutions of zinc chloride and sodium thiocyanate.

Non-solvents can comprise any liquid medium which is immiscible with the polyacrylonitrile or copolymers. Non-solvents can comprise urea, water, glycerin, propylene glycol, ethylene glycol or mixtures thereof.

Non-solvent dispersants can comprise any liquid medium which is immiscible with the acrylonitrile polymers or copolymers and the polymer solvent. Usually, they will comprise liquids of low polarity, such as aliphatic, aromatic or hydroaromatic hydrocarbons and their halogenated derivatives, low molecular weight polysiloxanes, olefins, ethers and similar such compounds.

Preferred solvent-nonsolvent systems comprise a solvent mixture of dimethyl sulfone-urea-water or dimethyl sulfoxide or dimethylsulfone with water, ethylene glycol, or propylene glycol added and the hot inert liquids of choice are aliphatic, aromatic, or hydroaromatic hydrocarbons such as mineral oil, low odor petroleum solvents, or kerosene. As extraction solvents, preferred are lower alkanols, such as methanol, ethanol, or lower ketones, such as acetone, and water.

Control of the external porosity and pore size distribution are both functions of the composition of the solution of polymer, solvent and non-solvent(s). The ability to control porosity and pore size by these parameters can bee seen from FIGS. 9, 10, 11, 12, 13, 14, 15, and 16. Table A, below, sets forth the ratios of raw materials used to prepare the homogeneous polymer solution use in the preparation of these beads.

TABLE A

| | | PORE CONTROL | | |
|---|---|---|---|---|
| FIG. | WATER* | UREA* | DIMETHYL* SULFONE | POLYACRYLONITRILE* |
| 9 | 3 | 0 | 24 | 1 |
| 10 | 3 | 0 | 24 | 1 |
| 11 | 6 | 0 | 24 | 2 |
| 12 | 6 | 0 | 24 | 2 |
| 13 | 1 | 2 | 24 | 3 |
| 14 | 1 | 2 | 24 | 3 |
| 15 | 1 | 6 | 24 | 1 |
| 16 | 3 | 6 | 24 | 1 |

*Units are in parts by weight.

Figure 9:
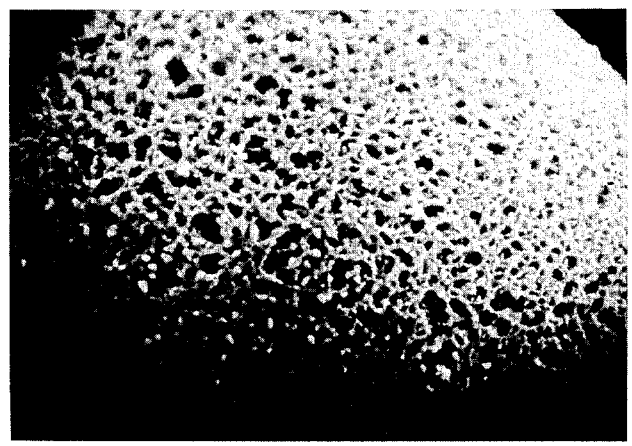
FIG. 9 is a photomicrograph at 2,570× magnification of a microporous polyacrylonitrile bead of this invention, illustrating a skinless exterior surface with substantially uniform pores.
Figure 10:
FIG. 10 is a photomicrograph at 4,470× magnifification of a section of a microporous polyacrilonitrile bead of this invention illustrating a uniform pore interior structure.
Figure 11:
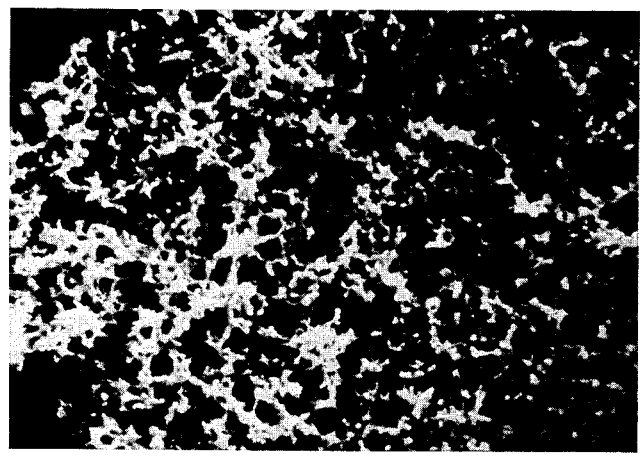
FIG. 11 is a photomicrograph at 2,230× magnification of a microporous polyacrylonitrile bead of this invention, illustrating a partially skinless exterior surface with substantially uniform pores and the ability to control exterior pore size.
Figure 12:
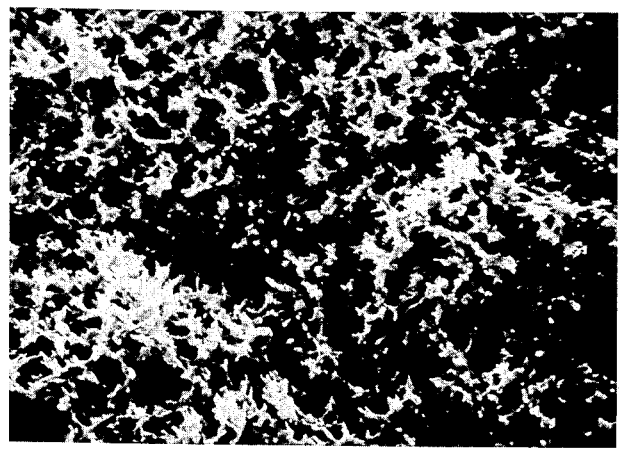
FIG. 12 is a photomicrograph at 4,640× magnification of a section of a microporous polyacrylonitrile bead of this invention (the bead being produced by the same procedure as in FIG. 11) illustrating a uniform pore interior structure and the abililty to control interior pore size.
Figure 13:
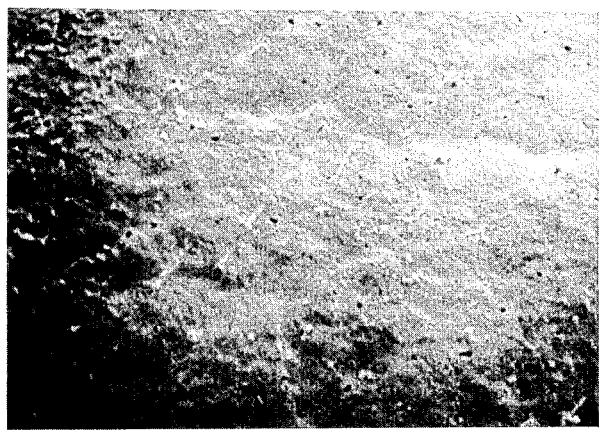
FIG. 13 is a photomicrograph at 4,710× magnification of a microporous polyacrylonitrile bead of this invention, illustrating a partially skinned exterior surface.
Figure 14:
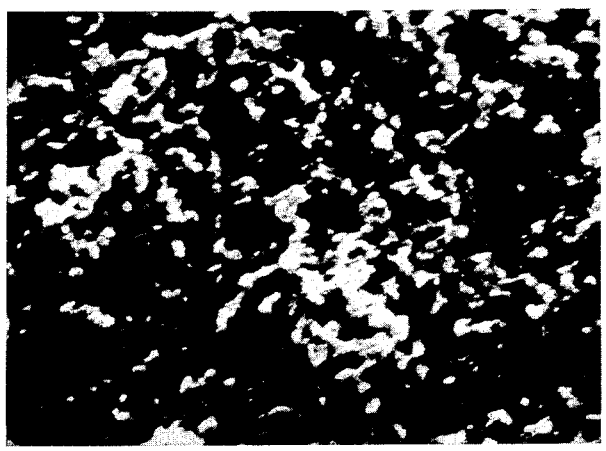
FIG. 14 is a photomicrograph at 8,660× magnification of a section of a microporous polyacrylonitrile bead of this invention (the bead being produced by the same procedure as in FIG. 13) illustrating the ability to control the interior pore size of partially skinned beads.
Figure 15:
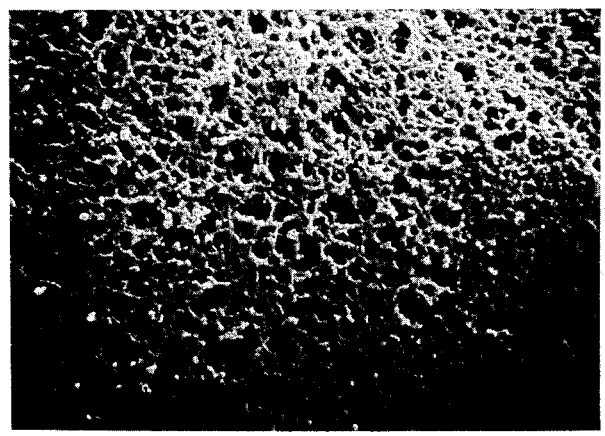
FIG. 15 and FIG. 16 are photomicrographs at 2,270× and 2,290× magnification, respectively, of microporous polyacrylonitrile beads of this invention further illustrating the ability to control exterior pore size.
Figure 16:
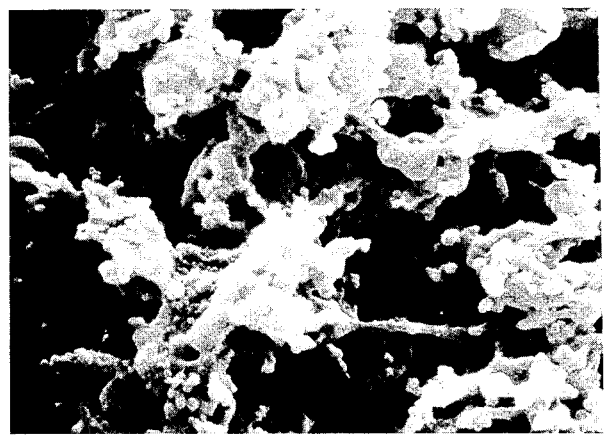

The polymer concentration has a greater effect on the external porosity of the bead than on the interior, as shown in FIGS. 9, 19, 11, 12, 13 and 14. This allows flexibility for preparing morphologies useful for slow-release applications, where the rate of release can be controlled by the extent of bead "skin" while maintaining internal porosity. FIGS. 9 and 13 show how much control over the external porosity is available while maintaining uniform internal porosity. This is unexpected in light of prior art, wherein polymer concentration is claimed to change morphology throughout the structure. See W. C. Hiatt, et al. *Materials Science of Synthetic Membranes,* ACS Symposium Series 269, 1985, pp. 230–244, see pp. 239–243, type III and type IV membranes from PVDF. The morphology of the present invention is also very difficult to obtain by conventional solvent phase separation techniques. In those cases, the solvent diffusion either causes asymmetric morphologies to be formed or much smaller pores. See U.S. 4,486,549, Example 1, wherein porous polyacrylonitrile particles formed from an atomizer cup and quenched in aqueous dimethyl formamide using a solvent phase inversion process, gave low pore volumes and non-spherical particles.

The overall size of the pores can be controlled by choice of the proper non-solvent. Pore size is also effected by both the phase separation temperature of the system and solidification temperature of its components. A larger gap between the phase separation temperature and solidification temperature tends to produce beads having larger pores.

In a convenient way of proceeding, a poly acrylonitrile copolymer (98/2 acrylonitrile/methyl acrylate by weight) is dissolved in a hot (110°–140° C.) solvent/non-solvent mixture designed so that the copolymer is soluble only at elevated temperatures (50° to 110° C.). The composition of the mixture required to meet this condition is determined by running cloud point experiments to determine the temperature where phase separation occurs. Preferably, the solvent will be either dimethylsulfoxide or dimethylsulfone and the non-solvent will be chosen from water, urea, glycerin, ethylene glycol, propylene glycol, or a combination thereof. Typical total solvent/non-solvent ratios will vary from 95/5 to 65/35 by weight. Polymer concentrations will range from 0.5 to less than 20 percent total polymer solids in the solvent/non-solvent solution with 0.5 to about 10 percent on the same basis being preferred.

The hot polymer solution is dispersed with stirring in a liquid e.g., mineral oil, which is substantially immiscible with the solution. Typically 1 volume of polymer solution is dispersed in 4 volumes of the liquid. The dispersion is then pumped through a static mixer (such as the mixer manufactured by Kenics) at a rate sufficient to form small droplets. The droplet size distribution can be controlled by the rate of flow through the static mixer. Typical diameters of the droplets range from 20 microns to 400 microns. After the droplets exit the static mixer they are diluted with additional cool mineral oil, typically 4 volumes, to cool the droplets below the phase separation temperature. The polymer phase separates from the solvent/non-solvent solution and then precipitates as droplets of solid polymer and solvent. The solid droplets are then removed from the mineral oil.

Other methods for forming small droplets of polymer solution in the dispersion include the use of a homogenizer, laminar jets, atomization nozzle, and an ultrasonic mixer. It is essential to the practice of this invention that the dispersion be subjected to a high shear process, thus ensuring the formation of substantially spherical droplets of uniform size and thereby precluding the need for secondary shaping as required by much of the prior art processes for use of their products in chromatographic separation processes.

The collected droplets are then extracted with a material which is miscible with the solvent/non-solvent mixture but not a solvent for polyacrylonitrile to produce porous beads. Acetone or water can be used. The extracted beads are dried to produce a micro-porous product. The pore size of the bead can be varied from 0.002 micron to 5 microns by varying the polymer or copolymer composition or the concentration and type of non-solvent used. The total pore volume is determined by the original concentration of the polymer or copolymer in the solvent/non-solvent solution. It is also contemplated by this invention to remove the solvent material from the solidified beads by any convenient method such as in the case of liquid solvent usage, by simple washing.

Specific applications of this technique will be exemplified in detail hereinafter.

When used herein and in the appended claims, the term "pore volume" means milliliters of void per gram of polyacrylonitrile. Pore volume is directly a function of the polymer concentration. Beads with pore volume greater than 1.5 ml/g are especially preferred. Pore volume is measured by conventional means, such as mercury porosimetry.

The term "substantially non-swellable in water" means that in water, volume will increase through swelling by less than 5 percent. Non-swellable beads are preferred since the bulk volume remains essentially constant in column chromatographic applications thus resulting in consistent flow rates and negligible head pressure losses. The term "skinless" is intended to define porous particles which do not exhibit a surface skin and thereby are efficient for direct absorption of high molecular weight molecules. Bulk density of the polymer beads is measured in conventional ways, e.g., by tapping to constant volume. The beads of this invention will preferably have a bulk density of greater than about 5 ml/g. Lower bulk densities are not as desirable because they tend to have lower capacities. The upper limit of bulk density is about 15 ml/g. At levels above this no economic advantages are noted and mechanical strength is reduced. The average bead diameter can vary widely, depending on its use. Preferably it will be from about 5 microns to about 2 millimeters, more preferably from about 5 microns to about 150 microns. Special mention is made of bead diameters of about 5 microns; these are uniquely suitable for analytical high pressure liquid chromatography. For other chromatography uses, in general, bead sizes of from about 5 to about 150 microns are preferred, especially from 5 to 20 microns, and especially preferably from 20 to 100 microns. Bead sizes can be measured in conventional ways, for example, by use of a particle size analyzer. Although the pore sizes can vary widely, and are measured in conventional ways, for example by nitrogen adsorption or mercury intrusion, it is preferred that the average pore diameter be from about 0.002 to about 5 microns and, especially preferably, from about 0.1 to about 1 microns. Also preferable are beads with an average pore diameter from about 0.002 to about 0.1 microns. When the beads are used to contain a compound, it is preferred that the compound comprise a protein, an enzyme, a hormone, a peptide, a nucleic acid, a polysaccharide, a dye, a pigment, or a mixture of any of the foregoing. Especially preferred for this are proteins. The beads may be filled with such a compound by any convenient means, for example, by physical entrapment, physical adsorption or chemical bonding depending on the compound. In any event, the porous beads used preferably will have pore diameters of at least about 3 times the diameter of the compound.

Conventional techniques are employed to utilize the adsorptive capacity of the porous beads of this invention. The beads can be used, for example, to adsorb vitamins, antibiotics, enzymes, steroids and other bioactive substances from fermentation solutions. They can be used to decolorize various sugar solutions. They can be used to decolorize saccharified wood solutions. They can be used as column packing for gas chromatography, size exclusion chromatography, affinity chromatography, ion exchange chromatography, reverse phase of hydrophobic interaction applications. They are useful to remove phenol, and to remove various surface active agents. They can adsorb a variety of perfumes. They can decolorize waste effluents in paper pulp production, they decolorize and purify a variety of chemicals. The beads are also especially useful for slow release applications when they are made under such conditions as to cause partial skins on their surface.

The beads of this invention are especially useful for protein separation. Proteins especially suitable for purification using the beads of this invention are alpha-lactoalbumin, albumin, gammaglobulin, albumin interferon, and the like.

DESCRIPTION OF THE PREFERRED EMBODIMENTS

The following examples illustrate the present invention. The claims are not to be construed as being limited thereto.

COMPARATIVE EXAMPLE 1A

Figure 2:
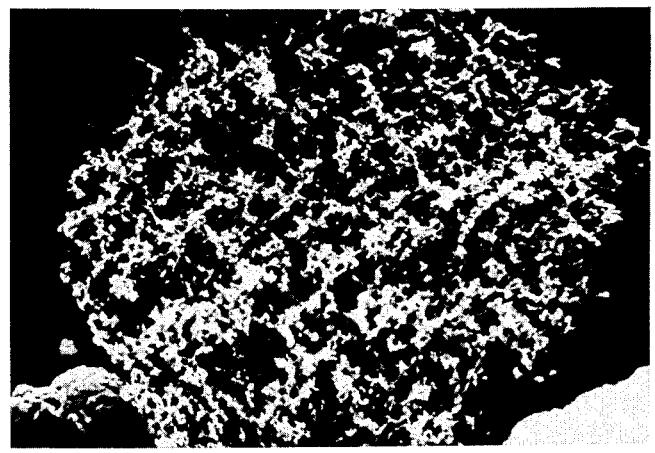
FIG. 2 is a photomicrograph at 2000× magnification of a cross section of a microporous bead of FIG. 1, illustrating high pore volume of 97 percent and uniform, non-cellular morphology.

Five grams of a wet copolymer containing 99 mole percent acrylonitrile and 1 mole percent of methyl acrylate (1:1 copolymer:water by weight) were ground with 5 grams of urea and 30 grams of dimethylsulfone to form a powdered mixture. The mixture was placed in a 1 liter flask with 100 ml of mineral oil heated to 160° C. The mixture was stirred until two liquid phases were present, one phase being a homogeneous polymer solution, the other mineral. Rapid stirring of the mixture with an overhead paddle stirrer gave a suspension consisting of droplets of the hot (about 120° C.) polymer solution in mineral oil. The droplets were cooled by transferring the suspension via a canula to a second stirred mixture consisting of 500 ml of mineral oil, 6 grams of dimethylsulfone, and 1 grame of urea kept at 70° C. The droplets solidified upon contacting the cooler mineral oil. The mixture was cooled with stirring to room temperature, then diluted with methylene chloride to reduce the viscosity of the oil. The droplets were collected on a Buchner funnel and washed with methylene chloride, then the solvent was extracted with 200 ml of acetone for 1.5 hours at room temperature. The resulting beads were examined by scanning electron microscopy and were seen to be highly porous, with relatively uniform pore diameters of about 0.5 microns. The pores extended through the outer surfaces of the beads. The beads made by this process without high shear ranged in size from 10 microns to a few millimeters. A SEM photograph of a cross-section of these beads appears as FIG. 2.

COMPARATIVE EXAMPLE 1B

Particles are made by the procedure taught in EXAMPLE 1 of Matsumoto, U.S. 4,486,549. 120 Grams of polyacrylonitrile homopolymer is dissolved in 1800 ml of dimethylformamide and the resultant solution is added dropwise by a rotational atomizer cup model PPH 306 00D (supplied by Sames Electrostatic Inc.) at a rate of 20 ml per minute into a 20% aqueous dimethylformamide solution whereby there were obtained particles of polacrylonitrile.

Figure 8:
FIG. 8 is a photomicrograph at 347× magnifification of a section of a prior art microporous polyacrylonitrile particle (Matsumoto, U.S. 4,486,549) showing a nonuniform disc-shaped structure.

An SEM photograph (FIG. 8) shows a different shape and morphology than obtained with the processes of the examples herein.

COMPARATIVE EXAMPLES 1C AND 1D

Figure 5:
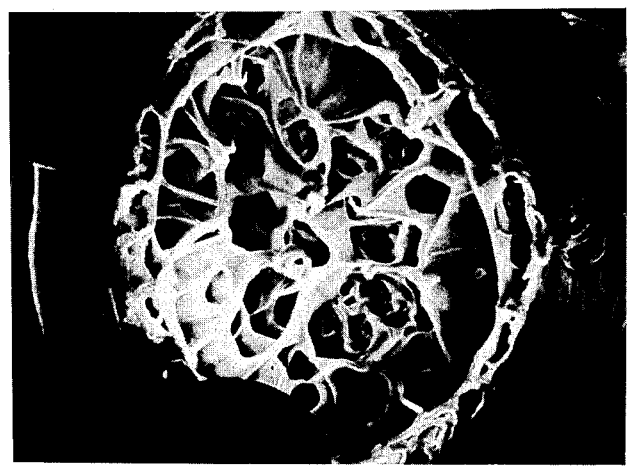
FIG. 5 is a photomicrograph at 111× magnification of a section of a prior art polyacrylonitrile particle (Stoy, U.S. 4,110,529, Example 1) showing a non-spherical "disc" shaped bead having a skin on the exterior surface.
Figure 6:
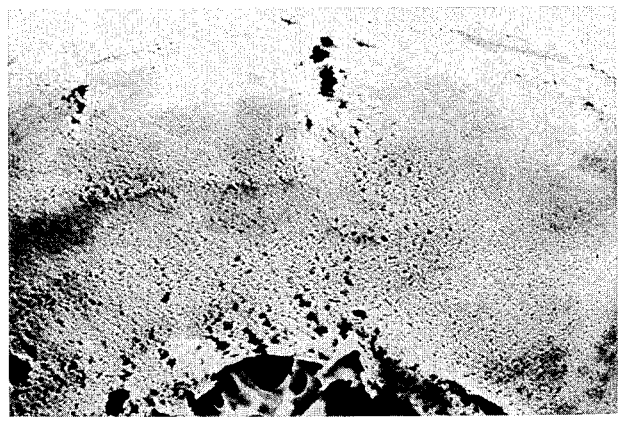
FIG. 6 is a photomicrograph at 442× magnifification of a section of a prior art polyacrylonitrile particle (Stoy, U.S. 4,110,529, Example 2) showing a bead with extremely large interior pores of 20 to 40 microns in diameter.
Figure 7:
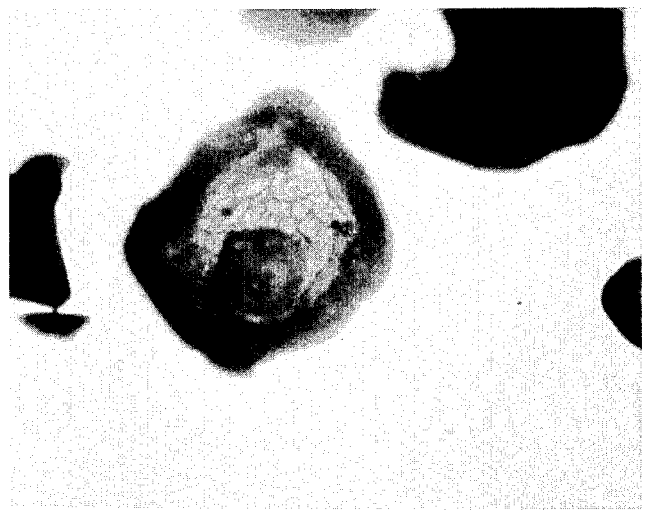
FIG. 7 is a photomicrograph at 50× magnifification, of a section of a prior art polyacrylonitrile particle (Stoy, U.S. 4,110,529, Example 2) showing a non-uniform pore structure.

Beads were prepared following the teachings of Stoy, U.S. 4,110,529. Following the general procedure of Example 1 of the Stoy, polyacrylonitrile was dissolved in dimethyl sulfoxide, dispersed in paraffin oil, and poured in a thin stream into water at 15° C. The procedure was repeated following Example 2 of Stoy (pouring the emulsion into water at 60° C.). The spherical porous beads were separated and photographed with a scanning electron microscope. The photographs appear as FIGS. 5 and 6. The beads are seen to have a porous exterior and extremely large interconnected pores in the interior, unlike those of the present invention in which the beads were substantially isotropic.

EXAMPLE 1

Ten grams of dry copolymer consisting of 99 mole percent acrylonitrile and 1 mole percent of methyl acrylate were ground with 10 grams of dimethylsulfone with a mortar and pestle. The mixture was then stirred and heated to 125° C. to form a homogeneous polymer solution. Mineral oil, 600 ml, at 140° C. was stirred using a Ross homogenizer, model LABME at a setting of 3. The hot polymer solution was slowly added to the mineral oil. Five minutes after all of the polymer solution was added, the suspension was diluted with a hot (140° C.) mixture of 1800 ml of mineral oil, 24 grams of dimethylsulfone, and 4 grams of urea. After the mixture was uniformly homogeneous, the heat was removed and the flask placed in an ice water bath. When the suspension reached 110° C., the homogenizer was turned off and the droplets were allowed to settle.

After cooling the mixture to room temperature, methylene chloride was added to dilute the mineral oil, then the droplets were collected on a Buchner funnel. The droplets were washed with methylene chloride, then extracted with 600 ml of acetone at room temperature for 16 hours. The resulting beads were again collected, washed with methanol, then dried at room temperature under vacuum. The beads were examined by scanning electron microscopy. The majority of the beads ranged from 100–400 microns in diameter, with pore diameters of about 1 micron. The beads were skinless, surface porosity being as high as the interior porosity. Smaller beads (less than 200 microns) can be obtained by increasing the setting to 5 on the Ross homogenizer.

EXAMPLE 2

One gram of dry copolymer consisting of 99 mole percent acrylonitrile and 1 mole percent methyl acrylate was ground with a mortar and pestle with 1 gram of deionized water, 2 grams of urea, and 12 grams of dimethylsulfone. The mixture was heated to 125° C. to form a homogeneous polymer solution. Hot mineral oil (60 ml, 150° C.) was agitated in a Branson Sonifier Model S75 at setting 7 (tuned to 4 amps). The hot polymer solution was slowly added, which increased the current to 6 amps. The suspension was mixed for a few minutes, then diluted with 180 ml of mineral oil (120° C.) containing 2.4 grams of dimethylsulfone and 0.4 grams of urea. The flask was placed in a water bath to cool the suspension. When the suspension reached 110° C. the Sonifier was turned off. After cooling to room temperature, the oil was diluted with methylene chloride and the droplets are collected on a Buchner funnel, then washed with methylene chloride. The droplets were extracted with 60 ml of acetone for 16 hours at room temperature, then again collected, but this time washed with methanol. The resulting beads were dried at room temperature under vacuum. The beads were examined by scanning electron microscopy and were found have high pore volume, pore diameters about 1 micron, and high surface porosity. The average bead diameter was about 50 microns.

EXAMPLE 3

One hundred forty four grams of dimethylsulfone and 12 grams of urea were combined with 720 ml of mineral oil and heated to 130° C. in a one-liter resin flask equipped with a stirrer, thermometer and dip leg. After the sulfone and urea melted, 6 grams of dry copolymer consisting of 99:1 mole ratio acrylonitrile: methyl acrylate and 18 grams of water were added and dissolved to form a homogeneous solution of polymer, dimethylsulfone, urea and water dispersed in mineral oil. The dispersion was then pumped at the dip leg and through a hot 140° C., Kenics® static mixer (0.25 in. i.d., 6 in. length) at a rate sufficient to form droplets of polymer solution dispersed in mineral oil. The exit of the static mixer was placed three inches above a stirred quench bath of four liters of room temperature mineral oil in which the droplets solidified. The droplets were collected and washed with a low boiling hydrocarbon to remove the mineral oil and dried. Dimethylsulfone was extracted from the droplets by placing them overnight in either 900 ml of acetone or 900 ml of methanol. More preferably, the dimethylsulfone may be extracted by stirring the droplets in one liter of hot, 80°–95° C., water for one hour. The stirrer cannot be allowed to contact the vessel walls or grinding of the droplets may occur. Beads formed in this manner were skinless, with pore diameters ranging from 0.1 to 1.5 microns with the majority of beads ranging from 25 to 425 microns.

EXAMPLE 4

The procedure of Example 3 was repeated using 3 percent of a 99 mole percent acrylonitrile—1 percent methyl acrylate copolymer, and 11 percent water as a non-solvent. Skinless microporous polymer beads in accordance with this invention were obtained, as illustrated in FIG. 1.

EXAMPLE 5

The thermal phase separation technique of Example 3 can be repeated with polyacrylonitrile copolymers containing from 50 to 98 mole percent of acrylonitrile and using dimethyl sulfoxide, dimethyl sulfone, water, urea, ethylene glycol, glycerine, and propylene glycol as solvent mixture components to produce microporous beads in accordance with this invention.

EXAMPLE 6

The microporous beads of Example 4 (FIG. 1) are packed into chromatographic column. A buffered aqueous solution of albumin is passed through the column. Protein is adsorbed in the microporous beads. There is then passed through the column a desorbent comprising a buffered aqueous salt solution. A large part of the protein is recovered in a purified, undenatured state.

EXAMPLES 7–8

The procedure of Example 6 is repeated, substituting buffered aqueous solutions of alpha-lactoalbumin and gamma-globulin for the albumin. The beads take up the respective proteins from solution, and they can be displaced in an undenatured state by desorption with buffered aqueous solutions having a higher salt concentration.

EXAMPLE 9

A mixture of 3 parts of 99:1 mole ratio acrylonitrile: methyl acrylate, 25 parts propylene glycol and 72 parts dimethylsulfone was heated to 130° C. to form a homogeneous solution. The solution was charged to a Parr reactor equipped with a magnetically driven stirrer and dip leg. The reactor was heated to 150° C. and then the solution was forced through heated, 140° C., lines into a heated ultra-sonic horn using pressurized, 35 psig, nitrogen. The flow was kept at a constant rate of 32 ml/min. The ultrasonic nozzle operated at 35 kHz and was tuned at 150° C. (nozzle and power supply obtained from Sono-tek Corp.). The energy input on the nozzle was 22 watts. The liquid droplets were quenched in a mineral oil bath located three inches below the ultra-sonic horn. The oil was decanted and the solidified droplets washed with heptane and dried. The dimethylsulfone was extracted with hot water to provide microporous beads of from about 50 to 1000 micron in diameter.

EXAMPLE 10

Two hundred eighty-eight grams of dimethylsulfone, 12 grams of polyacrylonitrile copolymer consisting of 99:1 mole ratio acrylonitrile: methyl acrylate, and 100 ml of propylene glycol were combined and placed in a Parr reactor equipped with a magnetically driven stirrer and dip leg. The reactor was heated to 140° C. to form a homogeneous solution. The solution was forced through heated, 140° C., lines and an atomization nozzle (for example, Lechler Co. full cone "center jet" nozzle, 0.46 in. diameter orifice). using 150 psig nitrogen pressure. The nozzle was mounted 3 inches over 3 liters of stirred mineral oil or 4 inches over 4 liters of stirred heptane to quench the liquid droplets. The solidified droplets were washed with heptane to remove mineral oil, dried and extracted for one hour with 3 liters of 85°–90° C. water to produce microporous beads. Pore sizes ranged from 0.5 to 1.5 microns with the majority of the beads between 25 and 150 microns.

EXAMPLE 11

A mixture of 6 grams of copolymer comprising 99:1 mole ratio acrylonitrile: methylacrylate, 54 grams propylene glycol and 140 grams dimethylsulfone was heated to 130° C. to form a homogeneous solution. The solution was charged to a 500 ml Parr reactor equipped with a magnetically driven stirrer and dip leg. The solution was heated to 150° C. and forced through heated, 150° C., lines and out a heated, 150° C., nozzle which consisted of seventy-five 50 micron diameter holes using 20 psig nitrogen pressure. The solution was forced at a constant flow rate of 75 ml/min. The laminar jets broke into liquid droplets which were quenched in a 750 ml heptane bath located 3–4 inches below the nozzle. The solidified droplets were collected and dried. The dimethylsufone was extracted with hot water to produce microporous beads with 80 percent of their volume ranging in size from 70 to 200 microns.

EXAMPLE 12

The procedure of Example 11 is followed except that the flow rate was kept at 30 ml/min and the solution vibrationally excited at the natural resonance frequency of the jet velocity (as per J. G. Wissema, G. A. Davies, *Canadian Journal of Chemical Engineering*, Volume 47, pp. 530–535 (1969)) to form uniformly sized liquid droplets.

The above-mentioned patents and publications are incorporated herein by reference.

Many variations will suggest themselves to those skilled in this art in light of the above, detailed description. For example, glucose and sucrose solutions can be decolorized by contact with the microporous beads of this invention; fatty acids such as butanoic acid, propionic acid and acetic acid can be adsorbed from aqueous solutions with them. Soaps and detergents can be adsorbed from solutions using them. Enzymes can be adsorbed in them and then used to catalyze reactions in substrates such as fermentation broths passed through the beads containing such bound enzymes. All such obvious variations are within the full intended scope of the appended claims.

EXAMPLE 13

Figure 3:
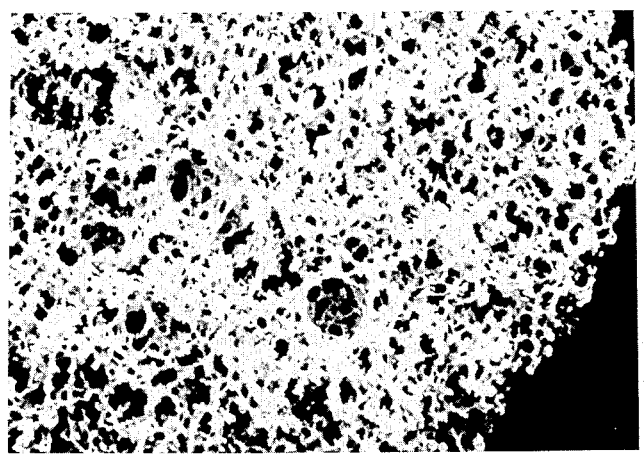
FIG. 3 is a photomicrograph at 1,440× magnification of a section of a poly(acrylonitrile) copolymer bead in accordance with this invention, illustrating a uniform diameter non-cellular pore morphology, a pore volume of 97 percent and substantial matrix uniformity.
Figure 4:
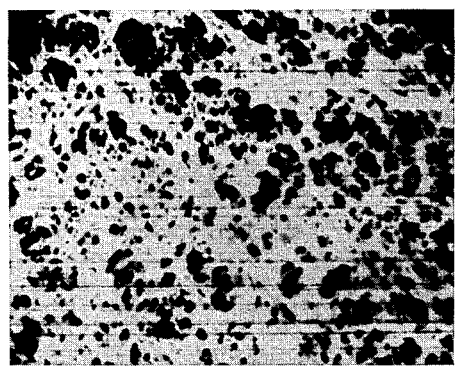
FIG. 4 is a photomicrograph at 2000× magnification of a section of a prior art polypropylene foam, (Castro, U.S. 4,519,909, FIG. 67) showing a 75 pore volume, microporous non-cellular structure. The structure is not a bead.

The procedure of Example 3 was repeated substituting 3 percent of a 99 mole percent acrylonitrile-1 mole percent methyl acrylate copolymer and 4 percent of water and 13 percent of urea. Microporous beads in accordance with this invention were obtained, a typical cross-section of the beads being illustrated at 1,440× magnification in FIG. 3.

We claim:

1. A process for the preparation of porous polymer beads with controllable surface porosity wherein said beads are substantially nonswellable in water and have substantially uniform pores of not substantially greater than about 5 microns in diameter, said process comprising
   (i) heating and mixing an acrylonitrile homopolymer or copolymer thereof with a mixture comprising a solvent and a non-solvent for the polymer to form a homogeneous solution having a polymer solids concentration range of from 0.5 to less than 20 percent:
   (ii) breaking the homogeneous solution into droplets using a high shearing technique;
   (iii) cooling the droplets, optionally in the presence of an inert liquid, to bring about phase separation and solidification of the polymer in the droplets;
   (iv) separating the solidified droplets from any inert liquid and removing the solvent.non-solvent mixture from the solidified droplets to produce porous beads.

2. A process as defined in claim 1 wherein step (i) further comprises dispersing the solution in a hot inert liquid and step (ii) comprises breaking the homogeneous dispersion into droplets by use of a static mixer.

3. A process as defined in claim 1 wherein step (ii) comprises breaking the homogeneous solution into droplets by use of an ultrasonic nozzle.

4. A process as defined in claim 1 wherein step (ii) comprises breaking the homogeneous solution into droplets by use of an atomization nozzle.

5. A process as defined in claim 1 wherein step (ii) comprises breaking the homogeneous solution into droplets through the use of laminar jets.

6. A process as defined in claim 1 wherein step (i) further comprises dispersing the solution in a hot inert liquid and step (ii) comprises breaking the homogeneous dispersion into droplets by homogenization.

7. A process as defined in claim 1 wherein said solvent comprises dimethyl sulfone, the non-solvent comprises urea, water, propylene glycol, ethylene glycol or a mixture thereof and step (i) is carried out at a temperature of at least about 130° C.

8. A process as defined in claim 1 wherein the inert liquid comprises mineral oil, kerosene, heptane, or a mixture thereof.

9. A process as defined in claim 1 wherein the inert liquid is extracted from the solidified droplets with a non-solvent for the polymer, said non-solvent comprising acetone, methanol, water, or a mixture thereof.

10. A process for the production of porous beads as defined in claim 1 wherein said polyacrylonitrile copolymer comprises an acrylonitrile copolymerized with a ($C_2$–$C_6$) monoolefin, a vinylaromatic, a vinylaminoaromatic, a vinyl halide, a ($C_1$–$C_6$) alkyl (meth)acrylate, a (meth)acrylamide, a vinyl pyrrolidone, a vinyl pyridine, a ($C_1$–$C_6$)hydroxyalkyl (meth)acrylate, a (meth)acrylic acid, an acrylamidomethylpropylsulfonic acid, an N-hydroxy- containing ($C_1$–$C_6$) alkyl(meth)acrylamide, or a mixture of any of the foregoing.

11. A process as defined in claim 1 further comprising the step of at least partially filling the pores of said porous beads with a compound.

12. A process as defined in claim 11 wherein said compound is selected from the group consisting of a protein, an enzyme, a hormone, a peptide, a polysaccharide, a nucleic acid, a dye, a pigment or a mixture of any of the foregoing.

13. A process as defined in claim 12 wherein said compound comprises a protein.

14. A process as defined in claim 12 wherein the pore diameter of said porous beads is at least about 3 times the diameter of said compound.

15. A process as defined in claim 1 wherein the homogeneous solution of step (i) contains less than about 10 weight percent total polymer or copolymer solids and the porous polymer beads are substantially skinless.

16. The product of the process as defined in claim 1 wherein the pore volume is not substantially less than about 1.5 ml/g.

17. A product as defined in claim 16 wherein said beads are substantially spherical.

18. A product as defined in claim 16 wherein said beads comprise a copolymer of from about 45 to about 99.5 mole percent of acrylonitrile.

19. A product as defined in claim 16 wherein the beads are substantially isotropic.

20. A product of the process as defined in claim 15.

* * * * *